(12) United States Patent
Kojima

(10) Patent No.: US 6,727,685 B2
(45) Date of Patent: Apr. 27, 2004

(54) WORK TRANSFER APPARATUS

(75) Inventor: Tomoyuki Kojima, Tokyo-To (JP)

(73) Assignee: Tokyo Weld Co., Ltd., Tokyo-to (JP)

( * ) Notice: Subject to any disclaimer, the term of this patent is extended or adjusted under 35 U.S.C. 154(b) by 78 days.

(21) Appl. No.: 10/059,836

(22) Filed: Jan. 23, 2002

(65) Prior Publication Data

US 2002/0096026 A1 Jul. 25, 2002

(30) Foreign Application Priority Data

Jan. 23, 2001 (JP) .......................................... 2001-014819

(51) Int. Cl.$^7$ ................................................. G01R 31/02
(52) U.S. Cl. ..................................... 324/158.1; 324/755
(58) Field of Search ........................ 324/551, 754–758, 324/761–762, 765, 158.1; 198/469.1, 624; 209/571–574, 684, 704, 919

(56) References Cited

U.S. PATENT DOCUMENTS

| | | | | |
|---|---|---|---|---|
| 4,940,935 A | * | 7/1990 | Riley | 324/755 |
| 4,978,913 A | * | 12/1990 | Hamuro et al. | 324/757 |
| 5,673,799 A | * | 10/1997 | Braden | 209/574 |
| 6,479,777 B2 | * | 11/2002 | Yamakawa | 209/574 |

* cited by examiner

*Primary Examiner*—Minh N. Tang
(74) *Attorney, Agent, or Firm*—Jacobson Holman PLLC

(57) ABSTRACT

A work transfer apparatus includes a turn table with a plurality of work-storing pockets for storing works at the outer periphery of the turn table and a base slidably supporting the works stored in the work-storing pockets of the turn table. A probing detector is provided in the base, and the probing detector comes in contact with the works in the work-storing pockets. An entire portion of the base which comes in contact with the works is made of insulant material.

5 Claims, 2 Drawing Sheets

WORK TRANSFER APPARATUS

FIELD OF THE INVENTION

The present invention relates to a work transfer apparatus for transferring works by a turn table which proximally rotates above a base.

RELATED ART

FIGS. 3 and 4 respectively show a conventional work transfer apparatus.

As shown in FIGS. 3 and 4, a work transfer apparatus 1 includes a turn table 3 with a plurality of work-storing pockets 2 for storing works W at the outer periphery of the turn table and a base 4 which is proximal to the turn table 3 and slidably supports the works W stored in the work-storing pockets 2. A probing detector 6 is provided in the base 4 below a measurement point for measuring electrical characteristics of the works W, which is capable of protruding upwardly so as to come in contact with the works W in the work-storing pockets 2. An insulant material 5 for guiding the probing detector 6 is provided in the base 4 only at a portion where the probing detector 6 is provided.

In the work transfer apparatus 1 shown in FIGS. 3 and 4, the works W such as electronic components are stored in the work-storing pockets 2 and slid above the base 4 with the rotation of the turn table 3 to be transferred to the measurement point near the probing detector 6. When the works W are transferred to the measurement point near the probing detector 6, the probing detector 6 provided in the base 4 moves up and protrudes from the upper surface of the base 4 so as to come in contact with the works W. The electrical characteristics of the works W are thus measured by the probing detector 6.

To measure the electrical characteristics of the works W stored in the work-storing pockets 2 by the probing detector 6 provided in the base 4 as described above, the works W must be slid above the base 4. Accordingly, it is preferable that the portion of the base 4 which comes in contact with the works W has no step so that the works W may be smoothly slid above the base 4.

Namely, when any steps are generated at the portion of the base 4 which comes in contact with the works W, the works W transferred by the turn table 3 may be caught by the steps. Then, a problem occurs that cracks and breaks of the works W take place.

However, when providing the insulant material 5 for insulating a plurality of probes partially at the measurement point of the electrical characteristics of the portion of the base 4 which come in contact with the works W, steps may be generated on the base 4 by the insulant material 5. The following measures are taken to eliminate the steps on the base 4. That is, a spacer is used or a machining is applied to equalize the height of the insulant material 5 and that of the portion other than the insulant material 5 of the base 4.

However, even if the machining is applied, it is difficult to eliminate steps between the insulant material 5 and the portion other than the insulant material 5 because the hardness and the viscosity of the materials of the insulant material 5 and the portion other than the insulant material 5 are different from each other. Since the insulant material 5 has to be built in the base 4 without generating any steps, a built-in technique with high accuracy is needed whereby another problem arises that a manufacturing cost becomes expensive. Further, the insulant material 5 and the portion other than the insulant material 5 are worn out by using the work transfer apparatus 1, and steps may be generated between the insulant material 5 and the portion other than the insulant material 5 because of the difference in their degree of wear.

SUMMARY OF THE INVENTION

The present invention is made in consideration of the above disadvantages. It is an object of the present invention to provide a work transfer apparatus which has no step at a portion of a base which comes in contact with works, and is capable of transferring the works smoothly to a measurement point near a probing detector without the works being caught by the base when transferred.

The work transfer apparatus according to the present invention comprises a rotatable turn table with a plurality of work-storing pockets for storing works at the outer periphery of the turn table, a base slidably supporting the works stored in the work-storing pockets of the turn table, and a probing detector provided in the base, capable of protruding upwardly so as to come in contact with the works stored in the work-storing pockets wherein an entire portion of the base which comes in contact with the works is made of insulant material.

In the work transfer apparatus, the probing detector may be disposed in a hole portion provided in the insulant material constituting the base.

In the work transfer apparatus, the base may include an insulant material portion on the turn table side and a holding portion holding the insulant material portion.

In the work transfer apparatus, the insulant material portion may be made of a single insulant material.

In the work transfer apparatus, the insulant material portion may have a ringed shape.

According to the present invention, as the entire portion of the base which comes in contact with the works is made of insulant material, the insulant material portion is uniformly worn out as a whole during operation of the work transfer apparatus. Therefore, steps cannot be generated at the portion of the base which comes in contact with the works.

DETAILED DESCRIPTION OF THE INVENTION

Figure 1:
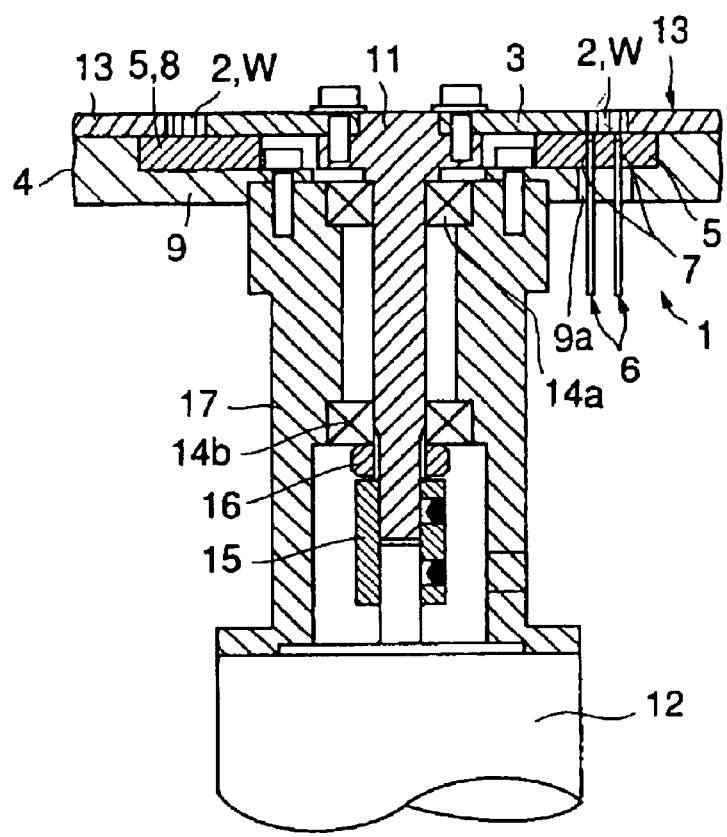
FIG. 1 is a structural view showing an embodiment of the work transfer apparatus according to the present invention.

An embodiment of the present invention will be hereinafter described with reference to the drawings. FIG. 1 is a structural view showing an embodiment of the work transfer apparatus according to the present invention, and FIG. 2 is a top view of the work transfer apparatus according to the present invention.

Figure 2:
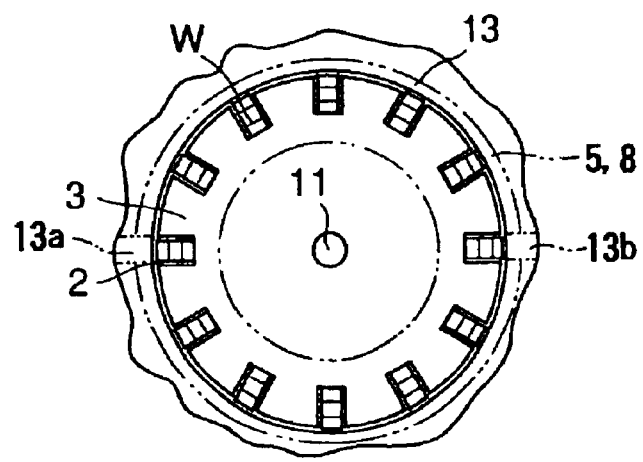
FIG. 2 is a top view of the work transfer apparatus according to the present invention.
Figure 3:
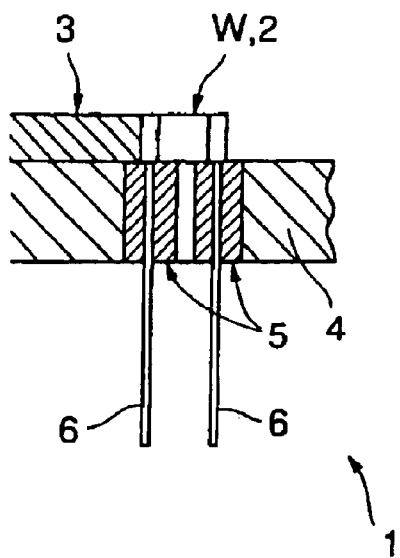
FIG. 3 is a structural view showing a conventional work transfer apparatus.
Figure 4:
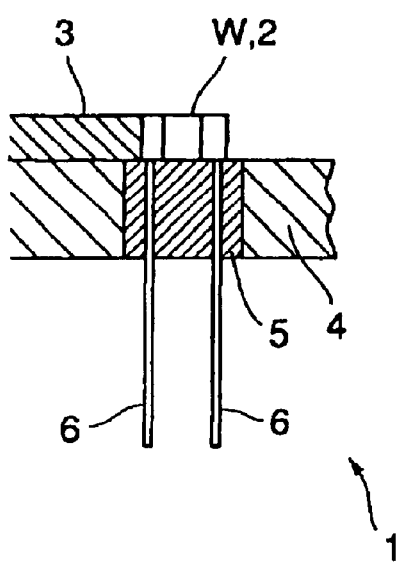
FIG. 4 is a structural view showing a conventional work transfer apparatus.

As shown in FIGS. 1 and 2, a work transfer apparatus 1 according to the present invention includes a turn table 3 with a plurality of work-storing pockets 2 for storing works W at the outer periphery of the turn table and a base 4 which is proximal to the turn table 3 and slidably supports the works W. A probing detector 6 is provided in the base 4, capable of protruding upwardly. When measuring electrical characteristics of the works W, the probing detector 6 moves up and comes in contact with the works W in the work-storing pockets 2 to measure the electrical characteristics thereof, and moves slightly down to a work sliding surface of the base 4 after measurement. A table drive shaft 11 is attached on the center portion of the turn table 3, and the table drive shaft 11 is connected to a control motor 12 through a coupling 15.

The base 4 is composed of an insulant material portion 8 which is positioned proximally to the turn table 3 and is formed of an insulant material 5 constituting an upper surface of the base 4, and a holding portion 9 made of steel for holding the insulant material portion 8. The insulant material portion 8 extends the entire peripheral portion of the base 4 which comes in contact with the works W and has a ringed shape when being viewed from above. Thus, the works W contact only the insulant material portion 8 of the base 4. The probing detector 6 is provided in the base 4 below a measurement point of the works W in the work-storing pockets 2. The probing detector 6 is disposed to pass through a hole portion 7 provided in the insulant material portion 8 constituting the base 4 which also serves as a guide. The probing detector 6 also passes through a hole 9a of the insulant material holding portion 9 so that the probing detector 6 does not come in contact with the insulant material holding portion 9. An index guide 13 having an inlet 13a and an outlet 13b is provided on the base 4 along the outer peripheral of the turn table 3. The index guide 13 prevents the works W from being scattered when the turn table 3 is rotated. The control motor 12 is attached to the insulant material holding portion 9 of the base 4 through a bearing 17. The table drive shaft 11 is held by the bearing 17 through a first bearing 14a and a second bearing 14b. The table drive shaft 11 has a nut 16 fixed thereto for holding the second bearing 14b.

An operation of the embodiment as is structured, is now described.

As shown in FIGS. 1 and 2, the turn table 3 is driven by the control motor 12 through the table drive shaft 11 to proximally rotate above the insulant material 5. When the turn table 3 rotates above the insulant material 5, the works W stored in the work-storing pockets 2 of the turn table 3 are slid above the base 4 to be transferred to the measurement point near the probing detector 6.

When the works W are transferred to the measurement point near the probing detector 6, the probing detector 6 which has downwardly receded from the upper surface of the insulant material 5, moves up and protrudes upwardly from the upper surface of the insulant material 5 so as to come in contact with the works W in the work-storing pockets 2. The electric characteristics of the works W are thus measured by the probing detector 6.

During this process, the works W contact the upper surface of the base 4, or the upper surface of the insulant material portion 8. Since an entire portion of the insulant material portion 8 of the base 4 which comes in contact with the works W is made of single material of the insulant material 5, the insulant material portion 8 is uniformly worn out so that no step is generated at the portion of the base 4 which comes in contact with the works W. Thus, there is no need for considering a difference of wear-out degree of materials when different materials are used.

Since the base 4 is composed of the insulant material portion 8 positioned at the entire portion which comes in contact with the works W and the holding portion 9 which holds the insulant material portion 8, the assemblage thereof is facilitated.

As described above, according to the present invention, no step is generated on the base which is resulted from the base contacting the works to be worn out. Therefore, when transferring the works by the turn table, the works are able to be smoothly transferred to the measurement point of the probing detector without being caught by the base.

What is claimed is:

1. A work transfer apparatus comprising:
    a rotatable turn table with a plurality of work-storing pockets for storing works at an outer periphery of the turn table;
    a base slidably supporting the works stored in the work-storing pockets of the turn table; and
    a probing detector provided in the base, capable of protruding upwardly so as to come in contact with the works stored in the work-storing pockets,
    wherein the rotatable turn table is rotated with respect to the base so that the works stored in the work-storing pockets slide on the base, and
    wherein an entire portion of the base which comes in contact with the works is made of insulant material.

2. The work transfer apparatus according to claim 1, wherein the probing detector is disposed in a hole portion provided in the insulant material constituting the base.

3. The work transfer apparatus according to claim 1, wherein the base includes an insulant material portion on the turn table side and a holding portion holding the insulant material portion.

4. The work transfer apparatus according to claim 3, wherein the insulant material portion is made of a single insulant material.

5. The work transfer apparatus according to claim 3, wherein the insulant material portion has a ringed shape.

* * * * *